(12) United States Patent
Ordille et al.

(10) Patent No.: US 8,566,311 B2
(45) Date of Patent: Oct. 22, 2013

(54) METHOD AND APPARATUS FOR NOTIFYING A USER OF A PREDEFINED CHANGES TO DYNAMIC ATTRIBUTES

(75) Inventors: Joann J. Ordille, South Orange, NJ (US); Nina M. Tandon, New York, NY (US); Qian Yang, Bound Brook, NJ (US)

(73) Assignee: Avaya, Inc., Basking Ridge, NJ (US)

( * ) Notice: Subject to any disclaimer, the term of this patent is extended or adjusted under 35 U.S.C. 154(b) by 1176 days.

(21) Appl. No.: 11/083,069

(22) Filed: Mar. 17, 2005

(65) Prior Publication Data

US 2005/0234993 A1    Oct. 20, 2005

Related U.S. Application Data

(60) Provisional application No. 60/554,232, filed on Mar. 18, 2004.

(51) Int. Cl.
*G06F 7/00*  (2006.01)
(52) U.S. Cl.
USPC ........................................................ 707/733
(58) Field of Classification Search
None
See application file for complete search history.

(56) References Cited

U.S. PATENT DOCUMENTS

| | | | |
|---|---|---|---|
| 5,742,668 A * | 4/1998 | Pepe et al. ..................... 455/415 |
| 5,812,865 A | 9/1998 | Theimer et al. |
| 5,873,084 A * | 2/1999 | Bracho et al. ................... 707/10 |
| 5,999,978 A | 12/1999 | Angal et al. |
| 6,021,443 A * | 2/2000 | Bracho et al. ................. 709/241 |
| 6,037,934 A * | 3/2000 | Himmel et al. ............... 715/760 |
| 6,041,360 A * | 3/2000 | Himmel et al. ............... 709/245 |
| 6,098,099 A | 8/2000 | Ellesson et al. |
| 6,112,246 A | 8/2000 | Horbal et al. |
| 6,158,007 A | 12/2000 | Moreh et al. |
| 6,173,310 B1 | 1/2001 | Yost et al. |
| 6,208,995 B1 * | 3/2001 | Himmel et al. ....................... 1/1 |
| 6,211,871 B1 * | 4/2001 | Himmel et al. ............... 715/744 |
| 6,381,594 B1 * | 4/2002 | Eichstaedt et al. .................... 1/1 |
| 6,404,880 B1 | 6/2002 | Stevens et al. |
| 6,442,565 B1 | 8/2002 | Tyra et al. |

(Continued)

FOREIGN PATENT DOCUMENTS

WO    WO 02/093886 A    11/2002

OTHER PUBLICATIONS

"EP Application No. 05251632.5 Office Action Oct. 2, 2006", , Publisher: EPO, Published in: EP.

(Continued)

*Primary Examiner* — Hung Q Pham
*Assistant Examiner* — Hubert Cheung
(74) *Attorney, Agent, or Firm* — IP Spring

(57) ABSTRACT

Methods and apparatus are provided for subscribing to dynamic attributes. One or more users are notified of information having a plurality of attributes, including at least one dynamic attribute. According to one aspect of the invention, a user can enter a subscription request to be notified when the at least one dynamic attribute changes a value. For example, the subscription request can notify the user when the dynamic attribute (i) changes a value to one or more predefined values; (ii) changes to satisfy a user specified condition; or (iii) changes to a value within a specified range of values. The subscription request can optionally include one or more temporal conditions. For example, the temporal conditions can evaluate whether the dynamic attribute satisfied a value constraint during a given time interval.

18 Claims, 9 Drawing Sheets

(56) References Cited

U.S. PATENT DOCUMENTS

| | | | |
|---|---|---|---|
| 6,446,114 B1 | 9/2002 | Bulfer et al. | |
| 6,457,046 B1 | 9/2002 | Munakata | |
| 6,463,462 B1 | 10/2002 | Smith et al. | |
| 6,502,093 B1 * | 12/2002 | Bhatt et al. | 707/3 |
| 6,604,093 B1 * | 8/2003 | Etzion et al. | 706/47 |
| 6,643,661 B2 * | 11/2003 | Polizzi et al. | 1/1 |
| 6,643,682 B1 * | 11/2003 | Todd et al. | 709/202 |
| 6,643,684 B1 | 11/2003 | Malkin et al. | |
| 6,643,705 B1 | 11/2003 | Wallace et al. | |
| 6,654,770 B2 | 11/2003 | Kaufman | |
| 6,671,715 B1 | 12/2003 | Langseth et al. | |
| 6,689,742 B1 | 2/2004 | Cerundolo et al. | |
| 6,725,333 B1 * | 4/2004 | Degenaro et al. | 711/118 |
| 6,728,715 B1 * | 4/2004 | Astley et al. | 707/10 |
| 6,754,832 B1 * | 6/2004 | Godwin et al. | 726/14 |
| 6,895,406 B2 * | 5/2005 | Fables et al. | 707/765 |
| 6,910,070 B1 | 6/2005 | Mishra et al. | |
| 6,965,917 B1 | 11/2005 | Aloni et al. | |
| 6,971,065 B2 * | 11/2005 | Austin | 715/763 |
| 6,990,633 B1 * | 1/2006 | Miyasaka et al. | 715/201 |
| 7,016,477 B2 | 3/2006 | Contractor | |
| 7,032,030 B1 | 4/2006 | Codignotto | |
| 7,103,592 B2 * | 9/2006 | Huret | 707/733 |
| 7,219,153 B1 | 5/2007 | Day | |
| 7,249,197 B1 * | 7/2007 | Roestenburg et al. | 709/246 |
| 7,278,065 B2 * | 10/2007 | Conkel | 714/48 |
| 7,287,230 B2 * | 10/2007 | Austin et al. | 715/763 |
| 7,372,833 B2 | 5/2008 | Kyronaho et al. | |
| 7,409,430 B2 | 8/2008 | Leukert-Knapp et al. | |
| 7,436,947 B2 * | 10/2008 | Ordille et al. | 379/219 |
| 7,452,268 B2 * | 11/2008 | Annunziata | 463/1 |
| 7,558,951 B2 | 7/2009 | Munshi | |
| 7,577,581 B1 | 8/2009 | Schuyler | |
| 7,626,952 B2 * | 12/2009 | Slemmer et al. | 370/270 |
| 7,937,655 B2 * | 5/2011 | Teng et al. | 715/255 |
| 2001/0018718 A1 | 8/2001 | Ludtke et al. | |
| 2002/0072348 A1 | 6/2002 | Wheeler et al. | |
| 2002/0072966 A1 | 6/2002 | Eldering et al. | |
| 2002/0091789 A1 * | 7/2002 | Katariya et al. | 709/214 |
| 2002/0111855 A1 * | 8/2002 | Hammerstad | 705/14 |
| 2002/0112073 A1 | 8/2002 | Melampy et al. | |
| 2002/0116336 A1 * | 8/2002 | Diacakis et al. | 705/51 |
| 2002/0169839 A1 | 11/2002 | Goldberg | |
| 2002/0184521 A1 | 12/2002 | Lucovsky et al. | |
| 2003/0009497 A1 * | 1/2003 | Yu | 707/513 |
| 2003/0014297 A1 | 1/2003 | Kaufman et al. | |
| 2003/0018771 A1 | 1/2003 | Vinberg | |
| 2003/0036960 A1 * | 2/2003 | Suzaki et al. | 705/14 |
| 2003/0055829 A1 | 3/2003 | Kambo et al. | |
| 2003/0093417 A1 * | 5/2003 | Kagimasa et al. | 707/3 |
| 2003/0193558 A1 | 10/2003 | Doss et al. | |
| 2003/0195698 A1 | 10/2003 | Jones | |
| 2003/0215067 A1 * | 11/2003 | Ordille et al. | 379/88.13 |
| 2003/0217109 A1 * | 11/2003 | Ordille et al. | 709/206 |
| 2003/0229722 A1 | 12/2003 | Beyda | |
| 2004/0003058 A1 | 1/2004 | Trossen | |
| 2004/0006606 A1 | 1/2004 | Marotta et al. | |
| 2004/0015371 A1 | 1/2004 | Thomas et al. | |
| 2004/0015778 A1 | 1/2004 | Britton et al. | |
| 2004/0029625 A1 * | 2/2004 | Annunziata | 463/1 |
| 2004/0029626 A1 * | 2/2004 | Annunziata | 463/1 |
| 2004/0039517 A1 * | 2/2004 | Biesinger et al. | 701/117 |
| 2004/0059705 A1 * | 3/2004 | Wittke et al. | 707/1 |
| 2004/0064387 A1 | 4/2004 | Clarke et al. | |
| 2004/0095939 A1 | 5/2004 | Yang | |
| 2004/0153413 A1 * | 8/2004 | Gross | 705/52 |
| 2004/0162943 A1 * | 8/2004 | Degenaro et al. | 711/118 |
| 2004/0225733 A1 | 11/2004 | Tesink et al. | |
| 2004/0254937 A1 * | 12/2004 | Gernold | 707/10 |
| 2005/0021383 A1 | 1/2005 | Fliess et al. | |
| 2005/0021622 A1 * | 1/2005 | Cullen | 709/204 |
| 2005/0033657 A1 * | 2/2005 | Herrington et al. | 705/26 |
| 2005/0086469 A1 | 4/2005 | Dunagan et al. | |
| 2005/0114401 A1 * | 5/2005 | Conkel | 707/200 |
| 2005/0165743 A1 * | 7/2005 | Bharat et al. | 707/3 |
| 2005/0171958 A9 | 8/2005 | Cheng et al. | |
| 2005/0262016 A1 | 11/2005 | Hill et al. | |
| 2006/0067309 A1 | 3/2006 | Zhakov et al. | |
| 2006/0253585 A1 | 11/2006 | Fein et al. | |
| 2007/0168550 A1 | 7/2007 | Wang et al. | |
| 2007/0203741 A1 * | 8/2007 | Ordille et al. | 705/1 |
| 2007/0299685 A1 | 12/2007 | Marsh | |
| 2008/0005278 A1 * | 1/2008 | Betz et al. | 709/219 |
| 2008/0046510 A1 * | 2/2008 | Beauchamp et al. | 709/204 |
| 2008/0249843 A1 * | 10/2008 | Gross | 705/10 |
| 2009/0037548 A1 * | 2/2009 | Ordille et al. | 709/206 |
| 2009/0082076 A1 * | 3/2009 | Annunziata | 463/1 |
| 2009/0110159 A1 | 4/2009 | Kalbag | |
| 2009/0110174 A1 | 4/2009 | Gallant et al. | |
| 2009/0201919 A1 | 8/2009 | Swartz | |
| 2009/0204977 A1 | 8/2009 | Tavares et al. | |
| 2009/0235084 A1 | 9/2009 | Ferraro et al. | |
| 2010/0064020 A1 | 3/2010 | Weyer et al. | |

OTHER PUBLICATIONS

"EP Application No. 05251632.5 Office Action Apr. 11, 2006", , Publisher: EPO, Published in: EP.

* cited by examiner

FIG. 5

EXEMPLARY ATTRIBUTE TEMPLATE TABLE – 500

| COMPANY | TOP CUSTOMER | SEVERITY | STATUS | SEid | SOURCE | FL # | LHN # | CITY | PROVINCE (STATE) | PN/ZIP | COUNTRY | PRODUCT | REGION | WORKGROUP |
|---|---|---|---|---|---|---|---|---|---|---|---|---|---|---|
| R |   | O | O | O | O |   |   |   |   |   |   | O |   | O |
|   | R | O | O | O | O |   | O | O | O | O | O | O | O | O |
|   |   | O | O | O | O | R | R |   |   |   |   | O |   | O |
|   |   | O | O | O | O |   | O | O | O | O | O | O | O | O |
|   |   | O | O | O | O |   | O | R | R | R |   | O |   | O |
|   |   | O | O | O | O |   | O | O | O | O | O | O | R | O |
|   |   | O | O | O | O |   | O | O | O | O | O | O | O | O |
|   |   | R | O | O | O |   | O | O | O | O | O | O | O | O |
|   |   | O | O | R | O |   | O | O | O | O | O | O | O | O |
| S | S | S | O | S | S | S | S | S | S | S | S | S | S | O |

ATTRIBUTE_MAP TABLE — 600

| REQUIRED ATTRIBUTE | OPTIONAL ATTRIBUTE | DYNAMIC/ STATIC | DYNAMIC ID | ATTRIBUTE TYPE | OWNER | APPLICATION ID |
|---|---|---|---|---|---|---|
| COMPANY | SEVERITY | STATIC | | OBJECT | MAESTRO | 1000014 |
| COMPANY | STATUS | DYNAMIC | Status001 | OBJECT | MAESTRO | 1000014 |
| COMPANY | SEid | STATIC | | OBJECT | MAESTRO | 1000014 |
| COMPANY | SOURCE | STATIC | | OBJECT | MAESTRO | 1000014 |
| COMPANY | CITY | STATIC | | OBJECT | MAESTRO | 1000014 |
| COMPANY | PROVINCE | STATIC | | OBJECT | MAESTRO | 1000014 |
| COMPANY | ZIP | STATIC | | OBJECT | MAESTRO | 1000014 |
| COMPANY | COUNTRY | STATIC | | OBJECT | MAESTRO | 1000014 |
| COMPANY | PRODUCT | STATIC | | OBJECT | MAESTRO | 1000014 |
| COMPANY | REGION | STATIC | | OBJECT | MAESTRO | 1000014 |
| COMPANY | WORKGROUP | DYNAMIC | Wg001 | OBJECT | MAESTRO | 1000014 |
| ... | ... | ... | ... | ... | ... | ... |

FIG. 7

Form for subscription by Company:
Name: [_____]
Status: Active

| Company | Company Values |
|---|---|
| Severity | Severity Values |
| SEid | SEid Values |
| Source | Source Values |
| ⋮ | ⋮ |
| Product | Product Values |
| Region | Region Values |

⟩ 710

☒ Notify me via  ▽ Default Profile

Notify me on these events:

| Status | ☐ When status changes to: Pending<br>☐ After ___ (d:hh:mm), if ticket status is: Assign<br>☐ After ___ (d:hh:mm), if ticket status has never changed to any of the following: Assign / ConFSO / ConTSO<br>☒ Notify me via ▽ Page 24x7 Profile |
|---|---|
| Work-group | ☐ When workgroup changes to: rdFSO<br>☐ After ___ (d:hh:mm), if workgroup is: IT<br>☐ After ___ (d:hh:mm), if workgroup has never changed to any of the following: ITAC / LABS<br>☒ Notify me via ▽ Default Profile |

⟩ 720

[Add Subscription]

FIG. 10

DYNAMIC ATTRIBUTE TABLE – 1000

| 1010 | 1020 | 1030 | 1040 | 1050 | 1060 | 1070 | 1080 |
|---|---|---|---|---|---|---|---|
| DYNAMIC ATTRIBUTE ID1 | DYNAMIC ATTRIBUTE NAME 1 | ASSOCIATION 1 | TYPE 1 | DYNAMIC SOURCE 1 | COMPARISON LIST 1 | DYNAMIC TIME 1 | TIME COMPARISON 1 |
| DYNAMIC ATTRIBUTE ID2 | DYNAMIC ATTRIBUTE NAME 2 | ASSOCIATION 2 | TYPE 2 | DYNAMIC SOURCE 2 | COMPARISON LIST 2 | DYNAMIC TIME 2 | TIME COMPARISON 2 |
| DYNAMIC ATTRIBUTE ID3 | DYNAMIC ATTRIBUTE NAME 3 | ASSOCIATION 3 | TYPE 3 | DYNAMIC SOURCE 3 | COMPARISON LIST 3 | DYNAMIC TIME 3 | TIME COMPARISON 3 |
| ... | ... | ... | ... | ... | ... | ... | ... |

FIG. 11

DYNAMIC_ATTRIBUTE TABLE – 1100

| DYNAMIC ATTRIBUTE ID | DYNAMIC ATTRIBUTE NAME | ASSOCIATION | TYPE | DYNAMIC SOURCE | COMPARISON LIST | DYNAMIC TIME | TIME COMPARISON |
|---|---|---|---|---|---|---|---|
| STATUS 001 | STATUS | TEMPLATE | STRING | STATUS | = | NONE | NONE |
| STATUS 001 | STATUS | TEMPLATE | STRING | STATUS | = | DATE CREATED | AFTER |
| STATUS 001 | STATUS | TEMPLATE | STRING | STATUS | HAS NEVER BEEN | DATE CREATED | AFTER |
| Wg001 | WORKGROUP | TEMPLATE | STRING | WORKGROUP | = | NONE | NONE |
| Wg001 | WORKGROUP | TEMPLATE | STRING | WORKGROUP | = | DATE CREATED | AFTER |
| Wg001 | WORKGROUP | TEMPLATE | STRING | WORKGROUP | HAS NEVER BEEN | DATE CREATED | AFTER |
| ... | ... | ... | ... | ... | ... | ... | ... |

DYNAMIC_ATTRIBUTE TABLE – 1200

| DYNAMIC ATTRIBUTE ID | DYNAMIC ATTRIBUTE NAME | ASSOCIATION | TYPE | DYNAMIC SOURCE | COMPARISON LIST | DYNAMIC TIME | TIME COMPARISON |
|---|---|---|---|---|---|---|---|
| STATUS 002 | STATUS | MESSAGE TYPE: CASE OPENED | STRING | STATUS | = | NONE | NONE |
| WORKGROUP 002 | WORKGROUP | MESSAGE TYPE: CASE OPENED | STRING | WORKGROUP | = | NONE | NONE |
| CASE MANAGER 02 | CASE MANAGER | MESSAGE TYPE: CASE OPENED | STRING | CASE MANAGER | = | NONE | NONE |
| ... | ... | ... | ... | ... | ... | ... | ... |

*FIG. 12*

CARDINALITY TABLE – 1300

| OWNER | DYNAMIC/STATIC | ATTRIB_TYPE | ATTRIB_NAME | CARDINALITY | SEARCH_SIZE |
|---|---|---|---|---|---|
| MAESTRO | D | ATTRIBUTE | STATUS | SMALL | 1 |
| MAESTRO | D | ATTRIBUTE | WOPRKGROUP | SMALL | 1 |
| MAESTRO | D | ATTRIBUTE | TIME | LARGE | 1 |
| MAESTRO | D | ATTRIBUTE | CASE MANAGER | LARGE | 1 |
| ... | ... | ... | ... | ... | ... |

*FIG. 13*

METHOD AND APPARATUS FOR NOTIFYING A USER OF A PREDEFINED CHANGES TO DYNAMIC ATTRIBUTES

CROSS REFERENCE TO RELATED APPLICATIONS

This application claims the benefit of U.S. Provisional Application No. 60/554,232, filed Mar. 18, 2004, and is related to U.S. patent application Ser. No. 10/184,236, filed Jun. 26, 2002, entitled "Method and Apparatus for Automatic Notification and Response;" U.S. patent application Ser. No. 10/184,325, filed Jun. 26, 2002, entitled "Method and Apparatus for Automatic Notification and Response Based on Communication Flow Expressions," and U.S. patent application Ser. No. 10/999,909, filed Nov. 30, 2004, entitled "Method and Apparatus for a Publish-Subscribe System with Templates for Role-Based View of Subscriptions," each incorporated by reference herein.

FIELD OF THE INVENTION

The present invention relates generally to communication methods and systems, and more particularly, to methods and systems that notify one or more users of information.

BACKGROUND OF THE INVENTION

Several technologies are available to notify users of events or new information. Typically, these technologies are based on email lists, bulletin boards, publish-subscribe systems, database triggers and filtering systems. A core issue in all of these systems is how the message to be sent is matched with interested subscribers. Email distribution lists and bulletin boards, for example, provide a fixed taxonomy of topics of interest. People subscribe to receive notifications for one or more topics by joining the email list or the bulletin board on that topic.

Publish-subscribe systems are also often organized with fixed taxonomies of topics. These systems are sometimes called topic-based (or type-based) publish-subscribe systems in the literature. Another category of publish-subscribe system is called the content-based publish-subscribe system. In these systems, attribute-value pairs in the message published are matched against user-specified constraints that are conjunctions of relational expressions over some of the attribute-value pairs (for example, item=car and price <$10,000) or, more generally selection queries in a normal form such as conjunctive normal form (for example, ((item=car) or (item=motorcycle)) and (price <$10,000)).

While such publish-subscribe systems provide an effective mechanism for notifying users of events or new information, they suffer from a number of limitations which, if overcome could make such publish-subscribe systems better suited for enterprise applications. For example, currently available publish-subscribe systems only allow users to enter subscriptions based on static attributes. A need therefore exists for improved publish-subscribe systems that allow users to enter subscriptions based on one or more dynamic attributes.

SUMMARY OF THE INVENTION

Generally, methods and apparatus are provided for subscribing to dynamic attributes. One or more users are notified of information having a plurality of attributes, including at least one dynamic attribute. According to one aspect of the invention, a user can enter a subscription request to be notified when the at least one dynamic attribute changes a value. For example, the subscription request can notify the user when the dynamic attribute (i) changes a value to one or more predefined values; (ii) changes to satisfy a user specified condition; or (iii) changes to a value within a specified range of values. The subscription request can optionally include one or more temporal conditions. For example, the temporal conditions can evaluate whether the dynamic attribute satisfied a value constraint during a given time interval.

A more complete understanding of the present invention, as well as further features and advantages of the present invention, will be obtained by reference to the following detailed description and drawings.

BRIEF DESCRIPTION OF THE DRAWINGS

FIG. 5 illustrates an exemplary attribute template table incorporating features of the present invention;

FIG. 6 is an attribute map table illustrating how the configuration of FIG. 5 is represented in the subscription server database;

FIG. 7 is an exemplary interface that allows a user to enter a subscription;

FIG. 10 illustrates an exemplary dynamic attribute table;

FIGS. 11 and 12 illustrate exemplary dynamic attribute tables that have been populated with exemplary data for a repair ticket processing application; and FIG. 13 is a cardinality table employed by one embodiment of the present invention.

DETAILED DESCRIPTION

Figure 1:
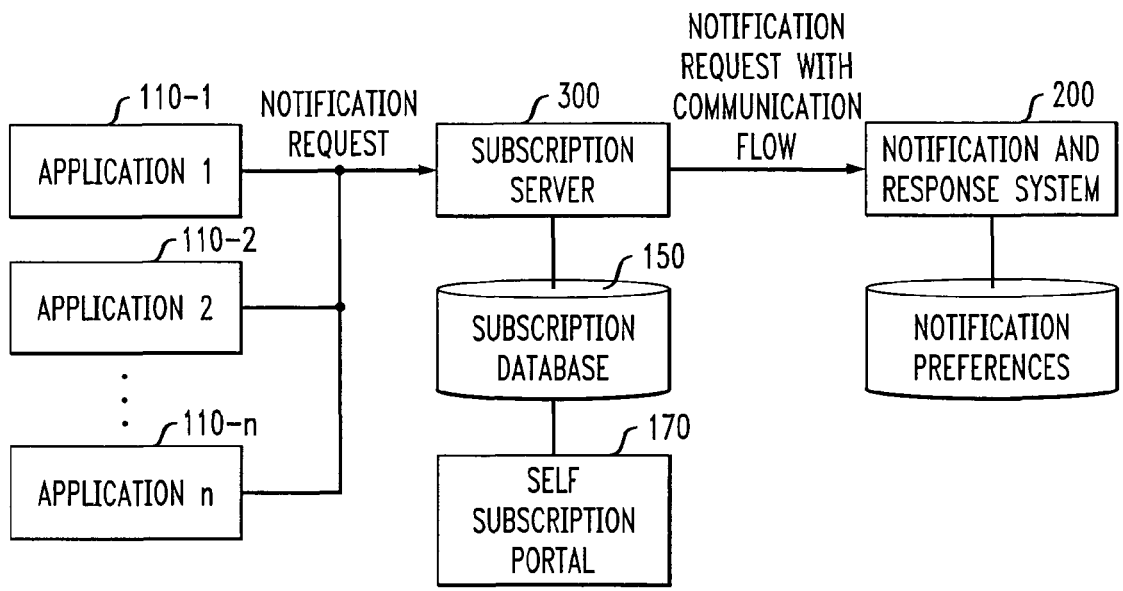
FIG. 1 illustrates a network environment in which the present invention can operate.

FIG. 1 illustrates a network environment 100 in which the present invention can operate. As shown in FIG. 1, one or more applications 110-1 through 110-N (hereinafter, collectively referred to as applications 110) provide notification requests to a subscription server 300, discussed below in conjunction with FIG. 3. As discussed hereinafter, the notification requests contain information that the applications 110 believe may be of interest to one or more users. According to one aspect of the invention, the subscribers have registered their interests with the subscription server 300 in the form of subscriptions recorded in a subscription database 150.

As discussed further below in a section entitled "Subscribing to Dynamic Attributes," the present invention allows a user to enter a subscription based on one or more dynamic attributes. Static attributes are attributes that will not change during the life span of a request. Dynamic attributes are thus attributes that will change during the life span of a request. The present invention allows a subscriber to subscribe to any combination of static attributes and ask to be notified when one or more dynamic attributes change to match a subscriber specified condition, such as changing to a particular value or changing to be within a range of values.

In one exemplary implementation, the users provide their subscriptions to the subscription server 300 using a self subscription portal 170. The self subscription portal 170 enables users to create, modify, and delete subscriptions. Given the notification requests from the applications 110 and the subscriptions recorded in the subscription database 150, the subscription server 300 can perform a matching process to identify those users that should be notified of given information.

The subscription server 300 employs subscribable objects that are specific things of potential interest to users. For example, using subscribable objects, applications 110 can specify information of interest based on, e.g., customers or customer locations. A user can subscribe to a subscribable object. For example, a user can subscribe to the subscribable object for a customer to be notified about service requests from that customer.

In addition, subscribable objects can have access controls applied to them, so, for example, the set of users who can subscribe to a specific customer can be restricted. Privileges specify what a user or role can do. Privileges can apply with respect to a specific person or object, or they can apply more generally. For example, an application may have the privilege to notify a specific user, or it may be able to notify any user. Privileges can include the ability of a person or role to subscribe to a subscribable object or to an application.

In this manner, the portal 170 can perform an initial access control when a user attempts to register a subscription to ensure that the user has the appropriate privileges required for the subscription. In addition, according to another aspect of the invention, the portal 170 ensures that a user only sees objects during the registration process that the user is authorized to view. In addition, the subscription server 300 can perform a secondary check at run time to ensure that the users associated with matching subscriptions are authorized to receive the notifications.

The subscription server 300 identifies the users having subscriptions that match the notification requests and provides a list of the matching users to a third party application, such as a notification and response system 200, discussed below in conjunction with FIG. 2, that will actually notify the users. In one exemplary implementation, the subscription server 300 generates a communication flow expression for the request that specifies who to contact (i.e., those users having subscriptions that match the request), under what conditions to contact ("only if Ann said yes") and when to contact ("between 9 a.m. and 5 p.m. weekdays"). Recipients specify rules for refining communication flow expressions with details of how, i.e., which devices to use, and when to contact them. Recipients may also automatically delegate some requests to other recipients. The communication flow expression is provided to the notification and response system 200 with the notification request that includes the content for the notification.

Subscriptions provide a mechanism for specifying in advance the application-specific events about which a user will be notified. Subscriptions enable applications 110 to create notification requests without having to generate a communication flow or explicitly identify the users to notify. Instead, the subscription server 300 uses subscription information to preprocess the request, identifying the users to notify and generating a communication flow. After this preprocessing, the notification and response system 200 executes the communication flow. Furthermore, subscriptions provide an easy way for users to define the conditions under which they want to be notified (self subscription). Users can also define the conditions under which other users are to be notified (automatic subscription).

As discussed more fully below, a subscription may be created based on (i) subscribable objects that represent characteristics of a request to which a user can subscribe, e.g., a customer or customer location; (ii) zero or more attribute values that specify the values of request attributes that match a user's subscription; and (iii) optional rules that specify further conditions to be met for a request to match a user's subscription. A subscription could include any combination of mechanisms, e.g., a subscribable object and a rule. A rule could contain a condition, or it could refer to a general rule. A general rule contains a condition that can be reused in multiple subscriptions, and can be a subscribable object. Each subscription has an owner and a subscriber, and may also have a delegate. The owner is typically the creator of the subscription, while the subscriber is the primary user to be notified. The delegate is a second or alternate user to be notified, when specified. For a notification to match a subscription, it must match at least one subscribable object of the subscription. It also must match at least one value of each attribute specified on the subscription, and it must satisfy all of the subscription's rules.

Generally, the applications 110 provide notification requests to the subscription server 300 when they have information to publish (that may be of interest to one or more subscribers). Thereafter, the subscription server 300 processes the notification requests and returns a status indication and notification and response system request identifier to the associated application 110. The application 110 can use this request identifier, for example, to process, update, delete or evaluate the status of the request. In addition, if responses are received by the application 110, the request identifier can be used to associate the received responses to the request.

Figure 2:
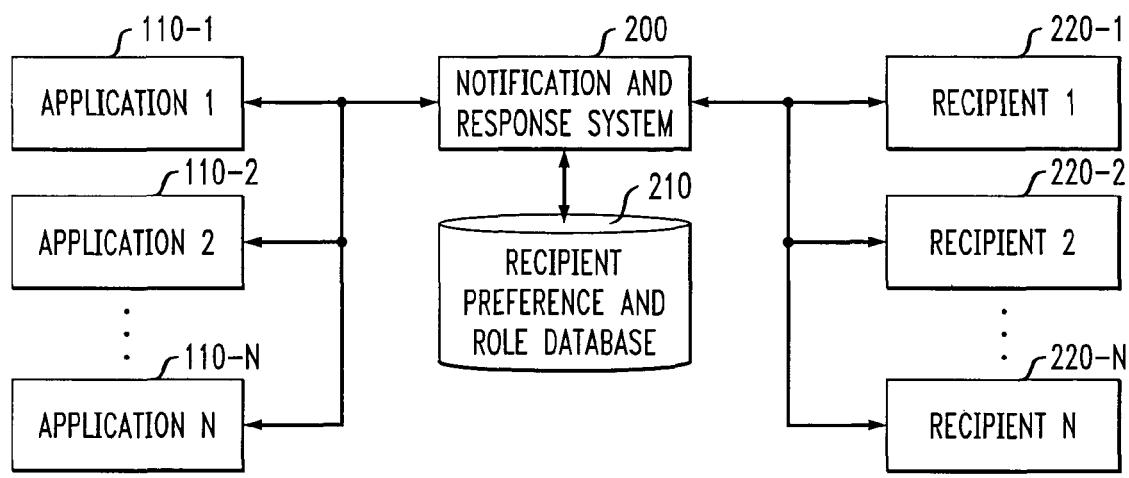
FIG. 2 illustrates an exemplary notification and response system of FIG. 1 in further detail.

FIG. 2 illustrates an exemplary notification and response system 200. The exemplary notification and response system 200 may be embodied, for example, as the Xui™ notification and response system, commercially available from Avaya, Inc. of Basking Ridge, N.J. and as described, for example, in U.S. patent application Ser. No. 10/184,236, filed Jun. 26, 2002, entitled "Method and Apparatus for Automatic Notification and Response;" and U.S. patent application Ser. No. 10/184,325, filed Jun. 26, 2002, entitled "Method and Apparatus for Automatic Notification and Response Based on Communication Flow Expressions," each incorporated by reference herein.

Generally, as shown in FIG. 2, the notification and response system 200 enables one or more applications 110 to communicate with one or more recipients 220-1 through 220-N, hereinafter, collectively referred to as recipients 220, by a number of different media, such as electronic mail, telephone, web page, pager or facsimile. Generally, the notification and response system 100 (i) sends requests to one or more recipients 220, using the medium specified by each individual recipient 220 in accordance with the individual's preferences (and recorded for example, in a recipient preference and role database 210); (ii)-collects and processes responses; and (iii) forwards the responses to their final destination by means of the medium specified by the final destination in accordance with the final destination's preferences. Roles provide a way of categorizing users and what they are allowed to do. The recipient preference and role database 210 also allows roles that are specified in a communication flow to be resolved to individual recipient names at the time the requests are transmitted.

The applications 110 create notification requests and submit them to the notification and response system 200. The notification requests must contain a communication flow to execute. Once the notification and response system 200 receives a notification request, the notification and response system 200 executes the communication flow logic to notify the recipients 220 and collect their responses. Generally, subscriptions specify criteria for deciding whether a user should be included in the communication flow for a request. A subscription belongs to a user and is specific to an application.

As discussed further below, the separation of the notification functionality provided by the notification and response system 200 from the subscription processing functionality provided by the subscription server 300 allows the subscription server 300 to handle issues like scalability, security and access controls, and availability.

Figure 3:
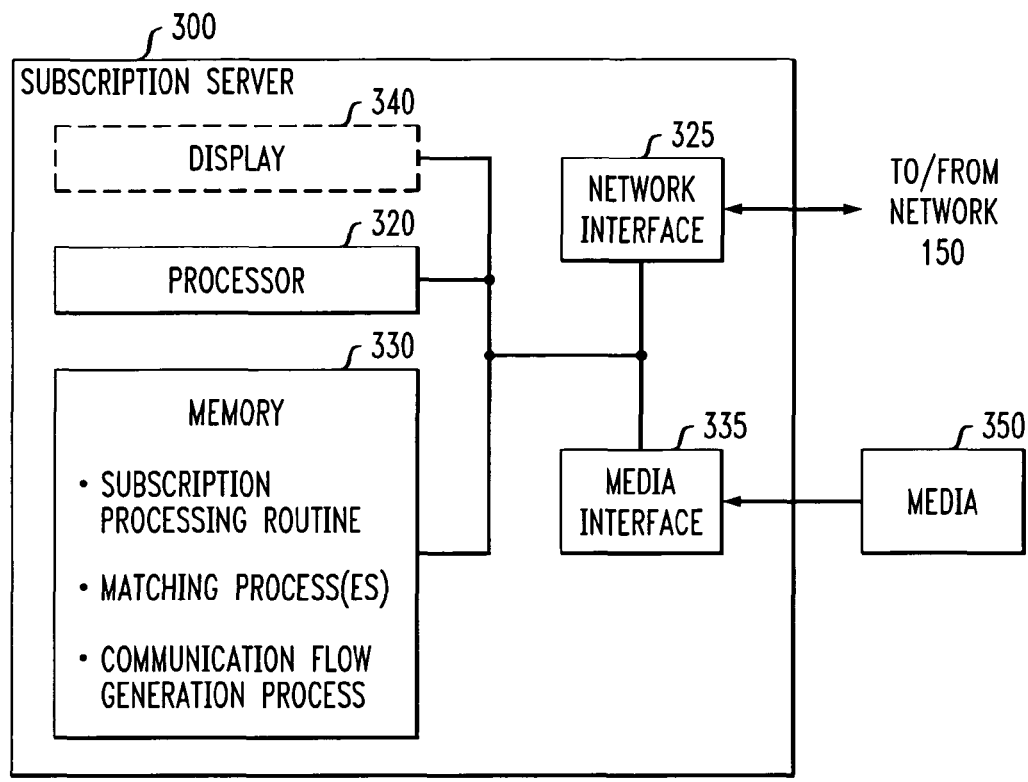
FIG. 3 is a schematic block diagram illustrating an exemplary implementation of the subscription server of FIG. 1 in further detail.

FIG. 3 is a schematic block diagram illustrating an exemplary implementation of the subscription server 300 of FIG. 1. As shown in FIG. 3, the subscription server 300 includes a computer system that interacts with media 350. The subscription server 300 comprises a processor 320, a network interface 325, a memory 330, an optional media interface 335 and an optional display 340. Network interface 325 allows the subscription server 300 to connect to a network, while media interface 335 allows the subscription server 300 to interact with media 350, such as a Digital Versatile Disk (DVD) or a hard drive. Optional video display 340 is any type of video display suitable for interacting with a human user of the subscription server 300. Generally, video display 340 is a computer monitor or other similar video display.

The memory 330 may comprise, for example, a subscription processing routine, one or more matching processes and a communication flow generation process. Generally, the subscription processing routine processes notification requests received from applications 110 and determines if they match any subscriptions, using one or more matching processes. In addition, the communication flow generation process processes the matching subscriptions to generate communication flows that can be provided to a third party for delivery of the subscriptions. The communication flow generation process also ensures that the recipient of a notification has proper privileges.

In one exemplary implementation, the subscription server 300 provides an API that enables applications 110 to create notification requests that notify users according to their subscriptions. To create a notification request, an application (subject to access controls) (i) creates a notification request; (ii) identifies subscribable objects, if any, associated with the requests, e.g., a customer, and (iii) identifies attributes of the notification.

Once a notification request has been created by an application 110 for subscription processing, the subscription server 300 processes the notification request to identify users and generate a communication flow. Generally, the subscription server 300 (i) identifies those subscriptions that are associated with the application 110 and that also match at least one subscribable object of the request or else have no subscribable objects (i.e., if a subscription has any subscribable objects, at least one of them must match a subscribable object of the request; in addition, the owner of the subscription must have privileges to subscribe to at least one matching subscribable object); (ii) of the subscriptions that match based on subscribable objects or have no subscribable objects, the subscription server matches the attributes of the request to the attributes of the subscriptions (one value of each attribute of a subscription must match the value of the same attribute on the request); and (iii) evaluates the rules of the subscriptions, if any, based on the attributes of the request. All of the rules of a subscription must evaluate to true for a match. The subscriptions that match a request based on subscribable objects (or have no subscribable objects), and which also match based on attributes and rules, match the request and are selected for notification.

Once the subscriptions that match a request have been identified, the subscription server 300 employs a communication flow generation process to identify the subscriber and optionally the delegate for the subscription, and includes those users in the communication flow for that request (subject to the privileges of the subscription owner). Specifically, the owner of the subscription must have the privilege to subscribe to a matching subscribable object, and also to notify the subscriber and delegate (if any). Subscriptions that do not have sufficient privileges are not added to the communication flow. Instead, appropriate errors are logged. For example, the subscriber is often the subscription owner, in which case the subscriber can be notified in the communication flow. If, however, the subscriber or delegate is not the owner, then the owner must have sufficient privileges to notify those users, or else an error occurs. The privileges of the subscription are also checked by the self subscription portal when the subscription is created or modified.

It should be noted that for each attribute (e.g., ZIP Code), the notification request can have at most one value (e.g., 07920). However, for a single attribute, a subscription may have any number of values. Both notification requests and subscriptions can have any number of subscribable objects.

For a high volume of requests and a large number of subscriptions, computational efficiency will become an issue in matching notification requests to subscriptions. There are several ways that the matching could be done in practice:

1. First of all, the subscription server could maintain a conventional tree type index on the subscribable object associations of the subscriptions. The subscription server could use this index to match the request to those subscriptions with the same subscribable objects as the request. The subscription server could then further filter the subscriptions based on their attribute values and rules.

2. It may be that some subscriptions have no associated subscribable objects. In this case, the request need only match the attribute values and rules of the subscription, and the approach above will not work. Instead the subscription server could maintain a bitmap index on the attribute values of the subscriptions. The subscription server could use this index to match the request to those subscriptions with the same attribute values as the request. The subscription server could then further filter the subscriptions based on rules.

Figure 4:
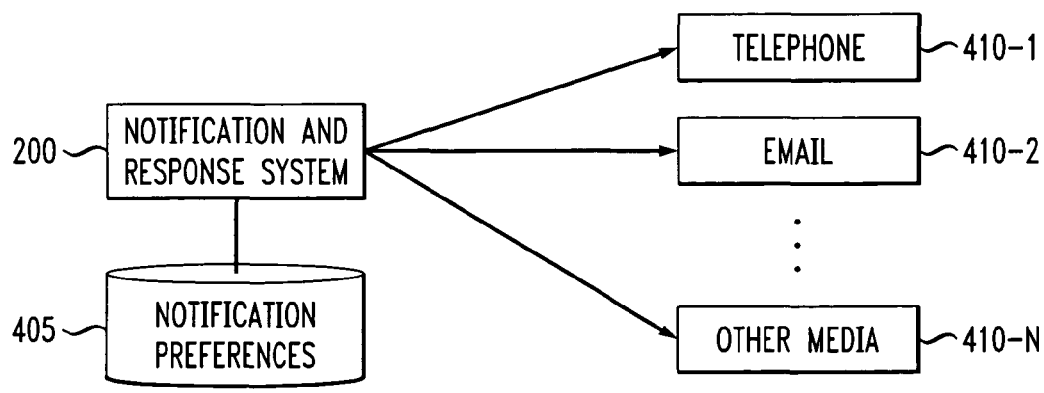
FIG. 4 illustrates the processing of notification and responses by the notification and response system in further detail.

FIG. 4 illustrates the processing of notification and responses by the notification and response system 200 in further detail. As shown in FIG. 4, the exemplary notification and response system 200 can send notifications to users using one or more media types 410, such as via telephone or email in an exemplary implementation, in accordance with user preferences recorded in a notification preferences database 405.

Subscribing to Dynamic Attributes

As previously indicated, attributes that will not change during the life span of a request are called static attributes. The others, that can change, are referred to as dynamic attributes. According to the present invention, the subscriber can subscribe to any combination of static attributes and ask to be notified when the dynamic attributes change to some desired values. For example, for a repair alert application, company name, severity, and product are static attributes, and status is a dynamic attribute. Subscribers can subscribe to Company One's repair alert for product A, of severity 4. If they are more interested in cases when status is refTSO (referred to Technical Support Organization), they can choose to be notified when the status changes to refTSO, since status is a dynamic attribute.

The list of valid values for dynamic attributes can vary for different value sets of static attributes. For example, only for messages of type case opened, the subscriber can ask to be notified when status is changed to assign, refTSO and so on (those options are not available for case completion messages). So when the users subscribe to the cases that have sub-events, the subscription portal should present a list of events and let them specify how they want to be notified, if at all, for the events.

Typically, static attributes define the characteristics of the events, e.g., severity of the ticket, origin of the problem and/or problematic product unit, while dynamic attributes monitor the processing of the events, or sub-events, i.e., current workgroup on one case, status of a ticket and so on. The ability to subscribe to dynamic attributes increases the granularity of the subscriptions. Subscribers can apply profiles of different urgency for each dynamic attribute value.

For those subscribers who care only about very specific problems related to major events, the ability to subscribe to dynamic attributes provides the functionality of filtering out unrelated information, which is indispensable in this information-overwhelming era. For example, the head of a FSO (Field Service Organization) team may only want to be notified when the status of a repair is changed to FSO.

During the life span of the notifications, subscribers can access either a web portal or a voice portal to obtain up-to-date information. For more critical problems, subscribers will set timed reminders to monitor the dangling problems and keep abreast of the changes. However, reminders only reflect the lapse of time, which is not specific. Subscribing to dynamic attributes is a mechanism that proactively provides specific up-to-date information.

In some cases, subscribers just want to be notified when a certain amount of time has passed. This may be achieved using reminders or using time as a dynamic attribute. The latter implementation has some advantages. The timers for reminders always start when the notification and response system initiates a request. When using time as a dynamic attribute, the notification and response system has access to the data of the requests, so temporal expressions and watch points can be set relative to a time specified in the request. This way, notifications can be initiated at a time relative to some time data in the requests. For example, some maintenance contracts state that all the repair tickets must be resolved within 4 hours of when a customer reports the problem. The notification and response system cannot necessarily send out a request the moment customers report a problem, but the time stamp of the customer report is included in the request data. By using time as a dynamic attribute and setting the timer based on the time of the customer report in the requests, application-based time constraints can be satisfied with better accuracy.

Some subscribers only subscribe to values of dynamic attributes that happen during a big event. When these subscribers get their notifications, they are presented with the context of the whole event such as data updates or responses that happened since the main event triggered the notifications. This feature provides real time reporting.

FIG. 5 illustrates an exemplary attribute template table 500 incorporating features of the present invention. As shown in FIG. 5, each row in the attribute template table 500 corresponds to a different template that defines how users can register their subscriptions, where "FL#" indicates a field location number that identifies a customer location and "LHN#" indicates a legal hierarchy node that identifies an organization entity of a customer (such as a holding company, subsidiary or division). Each column in the attribute template table 500 corresponds to a different exemplary attribute that an application has defined for classification. Every row in the attribute template table 500 represents one template for the ticket application. Each template in the attribute template table 500 identifies one or more attributes that can be employed as required attributes (R). For each template, the attribute template table 500 identifies the corresponding attributes that can be used as optional attributes (O) for the template.

The last row of the attribute template table 500 specifies whether each attribute is dynamic (D) or static (S). In the example of FIG. 5, only the status and workgroup attributes are dynamic attributes. All other attributes are static attributes.

For example, row 510 indicates that the company name is a required attribute. When this required attribute is supplied, values for the optional static attributes, i.e. severity, SEid, source, city, Province/state, Pn/Zip, country, product and region, can also be supplied. In addition, values for the optional dynamic attributes, i.e. status and workgroup, can be supplied. Another example, row 520 indicates that the combination of city and province/state is required in this case.

For the classification attributes, a list of valid values can be provided by the application. For example, severity codes can be from 1 to 4. But for some attributes, users need to input possible values when they subscribe. Applications must provide some mechanism to validate these values.

Again, after a user logs in to the subscription portal 170, the portal 170 presents a list of applications that the user has access to. Next to the application name is a list of the required attributes, which are links to different tables that are generated dynamically according to data in an attribute_map table, discussed hereinafter, in the subscription server 300.

FIG. 6 is an attribute_map table 600 illustrating how the configuration of FIG. 5 is represented in the subscription server database. As shown in FIG. 6, every tuple in the attribute_map table 600 represents one required and one optional attribute, with static or dynamic specified for the optional attribute. For those optional attributes that are dynamic attributes, an identifier is present in the dynamic id column, which is a pointer to Dynamic_Attribute table 1000 (FIG. 10). The entire data listed in FIG. 6 correspond to the first template (row 510) of FIG. 5 whose required attribute is Company (entries for other required attributes are omitted from FIG. 6 for clarity). Based on the data from the attribute_map table 600, combined with attribute values (from an attribute_value table) the subscription portal 170 can generate a form including all the static attributes, as described further in U.S. patent application Ser. No. 10/999,909, filed Nov. 30, 2004, entitled "Method and Apparatus for a Publish-Subscribe System with Templates for Role-Based View of Subscriptions."

As discussed further below, dynamic attributes have three important properties. First, dynamic attributes are time sensitive. Dynamic attributes monitor the processing of events, so their relative time (relative to some time in the data), or absolute time can be an indicator for some kinds of problems. Using the repair alert application as an example, it is normal for a ticket to have a "waiting for parts" status; but it indicates inventory problems if that ticket stays in "waiting for parts" status longer than a certain period of time.

Second, dynamic attributes exhibit data dependency. Thus, not all of the dynamic attributes are applicable to all the value sets of certain static attributes. For example, static attribute "message type" has possible values of case opened and case completed. Workgroup is a dynamic attribute. Only open messages have workgroup information, not completion messages. So this dependency of attributes needs to be addressed in the subscription server.

Third, dynamic attributes are part of the notification and response system request or/and response data. Dynamic attribute values are retrieved when updates are made to the existing ticket. In one exemplary implementation, they are in an XML data file, so XPath syntax is used to describe the source of the values of the dynamic attributes.

As discussed further below in conjunction with FIG. 10, a dynamic_attribute table 1000 addresses these three unique points of dynamic attributes versus status attributes.

FIG. 7 is an exemplary interface 700 that allows a user to enter a subscription. As shown in FIG. 7, a first section 710 of the interface 700 is associated with static attributes, while a second section 720 of the interface 700 is associated with dynamic attributes. The exemplary list of static attributes in section 710 is generated using data obtained from the attribute_map table 600 (FIG. 6). The exemplary list of dynamic attributes in section 720 is generated using data obtained from a dynamic_attribute table 1100, discussed below in conjunction with FIG. 11.

As indicated in the cardinality table 1300 (FIG. 13), the cardinality of the time attribute is large, but the cardinality of the status attribute is small. Thus, the various options for the status attribute can be presented to the user for selection, for example, from a pull-down menu. In addition, since the cardinality of the time attribute is large, the user can be prompted to enter a desired time. For example, if a subscriber fills in a time of 0:02:00, and selects a ticket status of Assign for the second option under Status in 720, a communication rule can be created with the following communication flow:

---

(TEST ? data('status[last( )]') == 'Assign' ? ANDTHEN <Page 24×7 Profile>)
    AFTER Data('datecreated') +0:02:00

---

Figure 8:
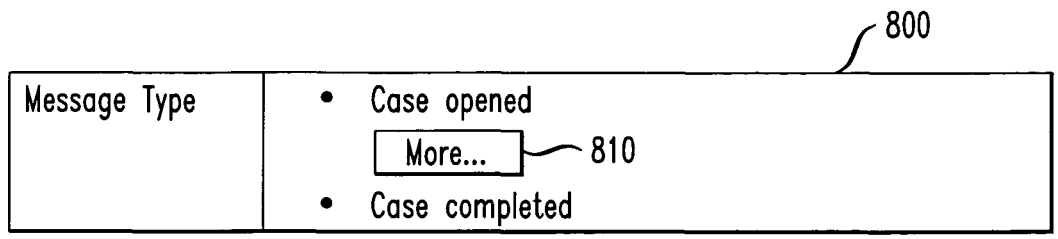
FIGS. 8 and 9 are an exemplary alternate interface that allow a user to enter a subscription by dynamic attributes.

FIG. 8 is an exemplary alternate interface 800 that allows a user to enter a subscription by dynamic attributes. In the example of FIG. 8, the dynamic attributes are associated with those messages where the message type is case opened. When a user presses the "More" button 810, a popup window 900 (FIG. 9) appears.

Figure 9:
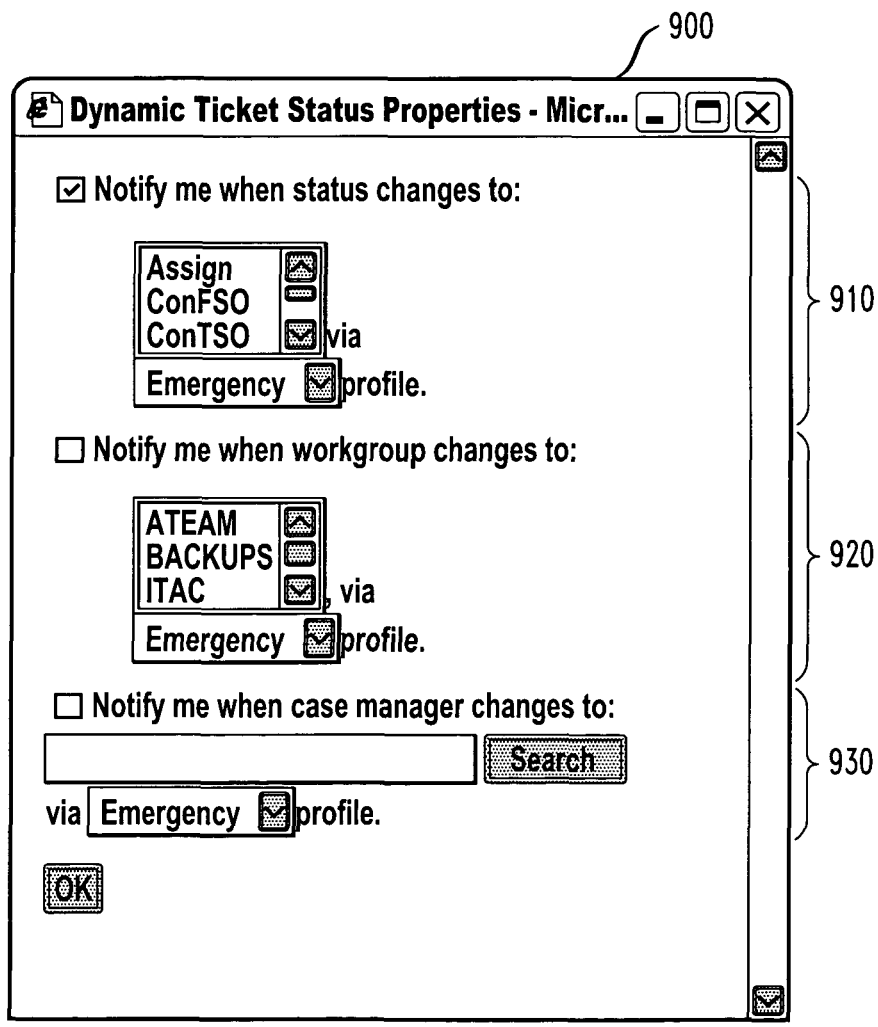

As shown in FIG. 9, a first section 910 of the interface 900 is associated with the dynamic status attribute, a second section 920 is associated with the dynamic workgroup attribute and a third section 930 is associated with a dynamic case manager attribute. The exemplary list of dynamic attributes in sections 910, 920, 930 are generated using data obtained from a dynamic_attribute table 1200, discussed below in conjunction with FIG. 12.

FIG. 10 illustrates an exemplary dynamic_attribute table 1000 that addresses the three unique points of dynamic attributes discussed above. As shown in FIG. 8, for each dynamic attribute, the dynamic_attribute table 1000 provides a dynamic attribute ID 1010 that is a pointer from the attribute_map table 600, which is the primary key of the dynamic_attribute table 1000. In addition, the dynamic_attribute table 1000 identifies the Dynamic Attributes Name 1020 that is the name of the dynamic attribute being displayed in the interface, e.g., Status or Workgroup.

The Association 1030 for a dynamic attribute can either refer to the whole template or one value of a static attribute.

For example, an association of "Template" indicates that the dynamic attribute applies to the template of ticket application. An association of "Message Type:Case Opened" indicates that the dynamic attribute only applies to the case when Message Type is Case Opened.

The Type 1040 of a dynamic attribute can be a number, string, or time. The Dynamic Source 1050 of the attribute value may be a single XML data element that changes, e.g., status of the ticket, or it may be an expression based on one or more data elements or system variables that change, e.g., time relative to the start of the notification, or relative to start of the case. The dynamic source and dynamic time are specified using communication flow test expression syntax and time expression syntax respectively.

The Comparison List 1060 lists all the possible test for the attribute. Some tests, such as =, !=, <, >, >=, <=, and ==where "=" is case insensitive and "==" is case sensitive, are text expression operators. Some tests are more complex operations such as "has never been" or "has been" which test the entire history of values for an attribute to see that certain values have not occurred or have occurred respectively. The Dynamic Time 1070 specifies either relative or absolute time when the dynamic attribute is being tested. Time comparison 1080 uses communication flow operators to specify how the dynamic attribute should be combined with time. For example, the operator AFTER is used for watching events that happen after a period of time. Sometimes, subscribers would like to be notified when some actions are taken before a fixed period of time, then the operator UNTIL can be used, as discussed below.

FIG. 11 illustrates an exemplary dynamic_attribute table 1100 that has been populated with exemplary data for a repair ticket processing application. As indicated above, FIG. 7 provides an exemplary interface 700 that allows a user to enter a subscription using the data of FIG. 11. As shown in FIG. 11, the Association 1030 for the status and workgroup dynamic attributes is Template, indicating that both the status and workgroup attributes are related to the template, but not a specific value of any static attributes. Dynamic Time 1070 is none in both row 1 and row 4, meaning no time constraint is applied to them. From row 2, the interface 700 can be created as:

After _____ (d:hh:mm), if ticket status is <list of status values>, as shown in section 720 of FIG. 7. From row 3, the interface 700 can be created as:

After _____ (d:hh:mm), if ticket status has never been <list of status values>.

FIG. 12 illustrates an exemplary dynamic_attribute table 1200 that has been populated with exemplary data for a repair ticket processing application. As indicated above, FIGS. 8 and 9 provide an exemplary interface 800, 900 that allows a user to enter a subscription using the data of FIG. 12. The exemplary list of dynamic attributes in sections 910, 920, 930 are generated using data obtained from the dynamic_attribute table 1200 of FIG. 12.

It is noted that subscriptions are submitted to the subscription server 300 for processing, but dynamic attribute values are kept in the recipient preference and role database, 210, to maintain the benefit of communication rules and communication flows.

EXAMPLES

Consider a user, userA, that has entered subscription 26929602. Subscription 26929602 includes a clause for dynamic attributes. The application communication flow can be expressed as follows:

```
(BROADCAST { NORESULT, [SubscriptionID: 26929602]
    <uid=userA,ou=people,o=avaya.com> } ) ? true ?
```

Continuing the example of FIG. 7, a user can use the interface 700 to enter the following subscriptions:

1. Notify me via Profile1 when status changes to "Assign."

The corresponding communication flow can be expressed as follows:

```
WATCH 'status' ? data('status[%%INDEX%%]') = "Assign"?
    ANDTHEN BROADCAST { <Profile1>, THIS }
```

2. After 2 days from when the customer reported the problem, if ticket status is still pending, notify me via Profile1.

The corresponding communication flow can be expressed as follows:

```
(TEST ? data('status[last( )]') == 'pending'? ANDTHEN <Profile1> )
    AFTER data('datecreated') + 2:00:00
```

3. After 2 days from when the customer reported the problem, if ticket status has never changed to Assign or ConFSO, notify me via Profile1.

The corresponding communication flow can be expressed as follows:

```
(TEST ? !boolean(data('status[text( )="Assign" or text( )"ConFSO"]')?
    ANPTHEN <Profile1> ) AFTER data('datecreated') + 2:00:00
```

4. Notify me every time ticket status is changed to EscTier4 (escalates to Tier4) in the first hour after the customer reports the problem.

The corresponding communication flow can be expressed as follows:

```
(WATCH "status"? data('status[%%INDEX%%]') = "EscTier4" ?
    ANDTHEN BROADCAST {<Profile1>, THIS } UNTIL
    data('datecreated') +01:00
```

System and Article of Manufacture Details

As is known in the art, the methods and apparatus discussed herein may be distributed as an article of manufacture that itself comprises a computer readable medium having computer readable code means embodied thereon. The computer readable program code means is operable, in conjunction with a computer system, to carry out all or some of the steps to perform the methods or create the apparatuses discussed herein. The computer readable medium may be a recordable medium (e.g., floppy disks, hard drives, compact disks, or memory cards) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk.

The computer systems and servers described herein each contain a memory that will configure associated processors to implement the methods, steps, and functions disclosed herein. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

It is to be understood that the embodiments and variations shown and described herein are merely illustrative of the principles of this invention and that various modifications may be implemented by those skilled in the art without departing from the scope and spirit of the invention.

We claim:

1. A method comprising:
    receiving from a first user at a subscription-server that is connected to a notification-and-response system a subscription request that is specific to an application, wherein a notification request is to be received from the application in response to:
        (i) a change in a value of a dynamic attribute in the application satisfies a first condition, wherein the dynamic attribute is associated with a value of a static attribute, and wherein whether the dynamic attribute is applicable to the static attribute depends at least in part on the value of the static attribute; and
        (ii) the static attribute in the application satisfies a second condition, and wherein the value of the static attribute to which the dynamic attribute is applicable is unchangeable during a life span of the subscription request,
    wherein the subscription request comprises a temporal condition that evaluates whether the dynamic attribute satisfied a value constraint during a given time interval; and
    pre-processing, by the subscription-server, the received subscription request before the first condition and the second condition are satisfied in the application, to generate a communication flow expression;
    in response to receiving the notification request from the application, executing the generated communication flow expression by the subscription-server, wherein the notification request indicates that the first condition and the second condition are satisfied; and
    transmitting the executed generated communication flow expression and the notification request to the notification-and-response system.

2. The method of claim 1, wherein the first condition requires that the value of the dynamic attribute changes to one or more predefined values.

3. The method of claim 1, wherein the first condition requires that the change in the value of the dynamic attribute is within a specified range of values.

4. The method of claim 1, wherein the dynamic attribute monitors a processing of events in the application.

5. The method of claim 1, wherein a plurality of attributes is presented to a user using a display format selected based on a cardinality of the corresponding attribute from the plurality of attributes.

6. The method of claim 1, wherein the application comprises a repair alert application and wherein the static attribute comprises one of a company name, a severity, a source, an address element, a region, and a product.

7. The method of claim 6, wherein the notification-and-response system transmits a notification message to at least one of the first user and a second user based on preferences of the first user.

8. The method of claim 1, wherein the change in the value of the dynamic attribute is relative to one or more static attributes.

9. The method of claim 1, wherein the dynamic attribute comprises one of a status of a repair, and a workgroup.

10. An apparatus comprising:
a network interface for transmitting to a notification-and-response system;
a memory that is non-transitory; and
a processor, coupled to the memory, enabling the execution of:
receiving from a first user a subscription request for an application, wherein at least one of the first user and a second user who is designated by the first user is to be notified in response to:
(i) a change in a value of a dynamic attribute in the application satisfies a first condition, wherein the dynamic attribute is associated with a value of a static attribute, and wherein whether the dynamic attribute is applicable to the static attribute depends at least in part on the value of the static attribute; and
(ii) the static attribute in the application satisfies a second condition, and wherein the value of the static attribute to which the dynamic attribute is applicable is unchangeable during a life span of the subscription request; and
pre-processing, by the subscription-server, the received subscription request before the first condition and the second condition are satisfied in the application, to generate a communication flow expression;
when receiving a notification request from the application indicating that the first condition and the second condition are satisfied, executing the generated communication flow expression; and
transmitting the executed generated communication flow expression and the notification request to the notification-and-response system.

11. The apparatus of claim 10, wherein the first condition requires that the value of the dynamic attribute changes to one or more predefined values.

12. The apparatus of claim 10, wherein the first condition requires that the change in the value of the dynamic attribute is within a specified range of values.

13. The apparatus of claim 10, wherein the dynamic attribute monitors a processing of events in the application.

14. The apparatus of claim 10, wherein an attribute is presented to a user using a display format selected based on a cardinality of the attribute.

15. The apparatus of claim 10, wherein the application comprises a repair alert application and wherein the static attribute comprises one of a company name, a severity, a source, an address element, a region, and a product.

16. The apparatus of claim 10, wherein the notification-and-response system notifies the at least one of the first user and the second user according to the subscription request.

17. The apparatus of claim 10, wherein the change in the value of the dynamic attribute is relative to one or more static attributes.

18. The apparatus of claim 10, wherein the dynamic attribute comprises one of a status of a repair, and a workgroup.

* * * * *